United States Patent
Hermsen

(10) Patent No.: US 11,671,695 B2
(45) Date of Patent: Jun. 6, 2023

(54) SYSTEMS AND METHODS FOR DETECTING TAMPERING WITH PRIVACY NOTIFIERS IN RECORDING SYSTEMS

(71) Applicant: GOOGLE LLC, Mountain View, CA (US)

(72) Inventor: Walter Hermsen, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 145 days.

(21) Appl. No.: 17/301,581

(22) Filed: Apr. 8, 2021

(65) Prior Publication Data
US 2022/0329714 A1    Oct. 13, 2022

(51) Int. Cl.
H04N 23/60    (2023.01)
H04N 7/18    (2006.01)

(52) U.S. Cl.
CPC ............. *H04N 23/60* (2023.01); *H04N 7/18* (2013.01)

(58) Field of Classification Search
CPC .................................. H04N 5/232; H04N 7/18
See application file for complete search history.

(56) References Cited

U.S. PATENT DOCUMENTS

| | | | |
|---|---|---|---|
| 9,239,949 B2 * | 1/2016 | Jung | H04N 21/4788 |
| 9,345,097 B1 * | 5/2016 | Ho | H05B 45/375 |
| 9,974,135 B1 * | 5/2018 | Nelson | G01J 1/4228 |
| 10,367,986 B1 * | 7/2019 | Berenberg | G08B 5/36 |
| 2006/0104616 A1 * | 5/2006 | Shellshear | H04N 5/765 |
| | | | 386/234 |
| 2011/0280551 A1 * | 11/2011 | Sammon | H04N 5/91 |
| | | | 386/242 |
| 2013/0155236 A1 * | 6/2013 | Ramdeo | H04N 7/183 |
| | | | 348/148 |
| 2013/0221851 A1 * | 8/2013 | Coates | H05B 45/12 |
| | | | 315/159 |
| 2014/0043440 A1 | 2/2014 | Tang et al. | |
| 2015/0235048 A1 * | 8/2015 | Balusu | H04N 21/4627 |
| | | | 348/207.1 |
| 2015/0318020 A1 * | 11/2015 | Pribula | H04N 21/2743 |
| | | | 386/290 |
| 2015/0323990 A1 * | 11/2015 | Maltz | G02B 27/0093 |
| | | | 345/173 |
| 2016/0050037 A1 * | 2/2016 | Webb | G08B 27/005 |
| | | | 455/3.01 |

(Continued)

FOREIGN PATENT DOCUMENTS

WO    2013144966 A1    10/2013

OTHER PUBLICATIONS

Dietz et al. "LEDs as Sensors" (Year: 2019).*

(Continued)

*Primary Examiner* — Fernando Alcon
(74) *Attorney, Agent, or Firm* — Brake Hughes Bellermann LLP

(57) ABSTRACT

A computer-implemented method includes activating, by a processor, a privacy notifier mechanism in a recording system to transmit a privacy notification signal when a camera in the recording system is in a ready state to capture images. The method further includes detecting blocking of transmission of the privacy notification signal, and responsive to detecting blocking of the transmission of the privacy notification signal by the processor, disabling the camera.

18 Claims, 9 Drawing Sheets

(56) References Cited

U.S. PATENT DOCUMENTS

| | | | | |
|---|---|---|---|---|
| 2016/0307082 | A1* | 10/2016 | Wurmfeld | G06K 19/07707 |
| 2018/0066975 | A1* | 3/2018 | Viswanathan | G01F 25/20 |
| 2019/0158789 | A1* | 5/2019 | Snyder | G06V 40/20 |
| 2021/0020200 | A1* | 1/2021 | Lu | H04N 7/147 |
| 2022/0094833 | A1* | 3/2022 | Vedula | G01J 1/44 |
| 2022/0156485 | A1* | 5/2022 | Tzvieli | H04N 5/23245 |
| 2022/0172700 | A1* | 6/2022 | Xiong | G06V 20/52 |
| 2022/0198140 | A1* | 6/2022 | Trim | G10L 17/02 |

OTHER PUBLICATIONS

"Cross-Talk Effects in OLED Displays", Software Evaluation; https://www.fluxim.com/quantifying-electro-optical-cross-talk-effects-in-displays, Feb. 21, 2022, 9 pages.
"Light Pipe Design Guide", Fundametals of LED Light Pipes—VCC; https://vcclite.com/light-pipe-design-guide/, 42 pages.
Braun , "Crosstalk in Passive Matrix Polymer LED Displays", Elsevier; Synthetic Metals 92, 1998, pp. 107-113.
George, Chris , "Spyware Alert! These Glasses Have a Built-In Camera to Record Everything You See", Digital Camera World; The Home of Digital Photography;, May 14, 2020, 9 pages.
Koelle, Marion , et al., "Beyond LED Status Lights—Design Requirements of Privacy Notices for Body-Worn Cameras", TEI '18, Stockholm, Sweden, Mar. 18-21, 2018, 11 pages.
Portnoff, Rebecca S., et al., "Somebody's Watching Me? Assessing the Effectiveness of Webcam Indicator Lights", CHI 2015, Seoul, Republic of Korea, Apr. 18-23, 2015, 10 pages.

* cited by examiner

410

Activating a privacy notifier mechanism in the recording system to transmit a privacy notification signal when the recording system is in a ready state to capture images

420

Detecting blocking of transmission of the privacy notification signal

430

Responsive to the detecting blocking of the transmission of the privacy notification signal by the processor, disabling the camera

SYSTEMS AND METHODS FOR DETECTING TAMPERING WITH PRIVACY NOTIFIERS IN RECORDING SYSTEMS

BACKGROUND

Modern technology has made image recording devices (e.g., cameras) smaller and cheaper. Cameras are everywhere: on traffic signals, in parking lots, inside stores, in video monitoring cameras for home security, in nanny cams for watching a baby, or in a video doorbell to see who is knocking. Cameras can be integrated with consumer electronic devices including phones and personal wearables such as eyeglasses, smart watches, and jewelry, etc. The cameras can be small and are often disguised. While these cameras have many perfectly legitimate uses for recording images, problems can arise when they cause advertent or inadvertent invasions of the privacy of persons in the fields of view of the cameras.

SUMMARY

In a general aspect, a computer-implemented method includes activating, by a processor, a privacy notifier mechanism in a recording system to transmit a privacy notification signal when a camera in the recording system is in a ready state to capture images. The method further includes detecting (i.e., recognizing) blocking of transmission of the privacy notification signal, and responsive to detecting blocking of the transmission of the privacy notification signal by the processor, disabling the camera.

In an aspect, the privacy notifier mechanism includes a light emitting element which, in a first operation state, transmits the privacy notification signal by emitting light and in another, second operation state is configured to detect blocking of light emitted by the light emitting element.

In a further aspect, the privacy notifier mechanism includes a light emitting diode, LED, and activating, by the processor, the privacy notifier mechanism includes forward biasing the LED to emit light. Further, detecting blocking of the transmission of the privacy notification signal includes detecting blocking of light emitted by the LED.

In an aspect, the LED is placed across two general purpose input output (GPIO) pins of a controller, and the method includes: applying logic high-low signals to the GPIO pins for forward biasing the LED to emit light, and for reverse biasing the LED to place the LED in a photodetector mode.

In an aspect, the computer-implemented method includes reverse biasing the LED to place the LED in the photodetector mode and detecting blocking of the transmission of the privacy notification signal.

In an aspect, the computer-implemented method includes measuring ambient light entering the LED in the photodetector mode and comparing that with ambient light sensed through the camera to, for example, detect blocking of the transmission of the privacy notification signal. Measuring ambient light entering the LED in the photodetector mode can include measuring a discharge time of a charge accumulated on parasitic capacitances of the LED in the photodetector mode.

In a further aspect, the computer-implemented method includes comparing the measured discharge time of the charge accumulated on parasitic capacitances in the LED with a reference discharge time; and detecting (i.e., recognizing) blocking of the transmission of the privacy notification signal when the measured discharge time of the charge accumulated on parasitic capacitances is greater than the reference discharge time.

In another further aspect, the computer-implemented method can include measuring a temperature of the LED in the recording system and temperature compensating a value of the reference discharge time used for comparison with the measured discharge time.

In an aspect, measuring the discharge time of the charge accumulated on the parasitic capacitances of the LED in the photodetector mode can include measuring a voltage on a GPIO pin as a function of time and identifying a time when the voltage crosses a logic threshold (in other words, identifying a time it takes the voltage to cross the logic threshold) as the discharge time.

In an aspect, the privacy notifier mechanism includes a speaker (e.g., an electro-acoustic transducer), and activating, by the processor, the privacy notifier mechanism includes activating a speaker to broadcast a sound signal indicative of the presence of the camera.

In a further aspect, detecting blocking of transmission of the privacy notification signal can include comparing speaker sounds received by a microphone with a reference speaker sound.

In a further aspect, detecting blocking of transmission of the privacy notification signal includes detecting an absence or a reduction in an intensity of the reference speaker sound.

In a general aspect, a system includes a camera unit including a camera, a controller including at least one processor, and a memory storing instructions that, when executed by the at least one processor, cause the at least one processor to perform one or more of the foregoing methods.

In a general aspect, a system includes a camera unit including a camera and a light emitting diode, LED. The system further includes a controller including at least one processor and a memory storing instructions. The instructions when executed by the at least one processor, cause the at least one processor to forward bias the LED to emit light when the camera is in a ready state to capture images, to periodically reverse bias the LED to place the LED in a photodetector mode to detect blocking of the LED, and responsive to detecting blocking of the LED, disable the camera.

In an aspect, in the system, the LED is placed across two general purpose input output (GPIO) pins of the controller, and the instructions cause the processor to apply logic high-low signals to the GPIO pins for forward biasing the LED to emit light, and for reverse biasing the LED to place the LED in the photodetector mode. Further, the instructions cause the processor to measure ambient light entering the LED in the photodetector mode by measuring a discharge time of a charge accumulated on parasitic capacitances of the LED in the photodetector mode, compare the measured discharge time of the charge accumulated on parasitic capacitances with a reference discharge time, and detect (recognize) blocking of the LED when the measured discharge time of the charge accumulated on parasitic capacitances is greater than the reference discharge time.

In an aspect, the system can include a temperature sensor, and the instructions can further cause the processor to measure a temperature of the LED and temperature compensate a value of the reference discharge time used for comparison with the measured discharge time.

In an aspect, the system can measure the discharge time of the charge accumulated on the parasitic capacitances of the LED in the photodetector mode by measuring a voltage on a GPIO pin as a function of time and identifying a time it takes the voltage to cross a logic threshold as the discharge time.

In further aspect, in addition or in the alternative to the foregoing systems, a system may be provided in which the camera unit further includes a speaker, and a microphone. The instructions can cause the processor to activate the speaker to transmit a sound signal indicative of a presence of the camera capable of capturing images of bystanders, compare speaker sounds picked up by the microphone with a reference speaker sound, and identify an instance of tampering with the speaker when the speaker sounds picked up by on-board microphone show an absence of, or a reduction in an intensity of the reference speaker sound.

BRIEF DESCRIPTION OF THE DRAWINGS

FIG. 4 is a flowchart of an example method, in accordance with the principles of the present disclosure.

DETAILED DESCRIPTION

Figure 1A:
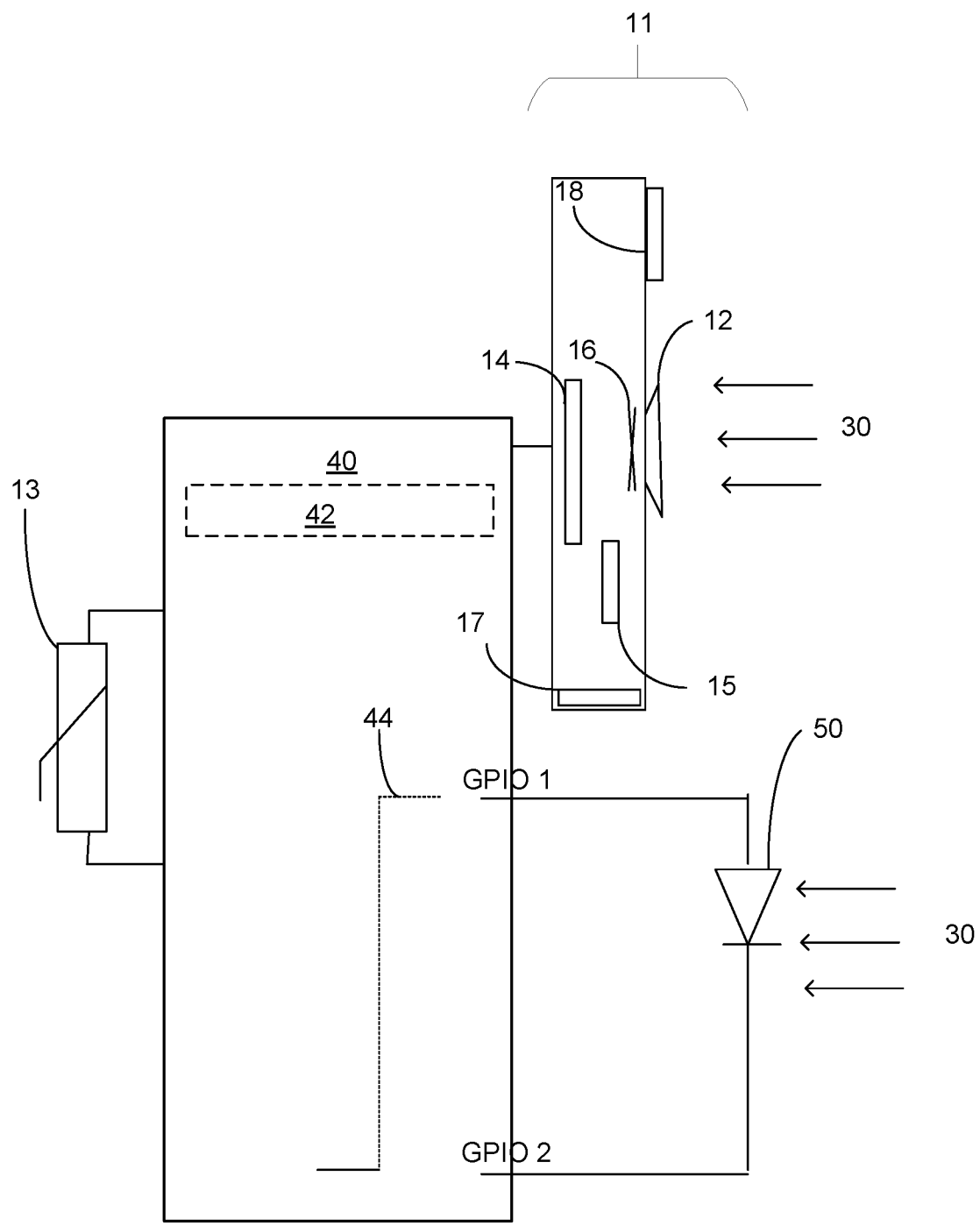
FIG. 1A is a block diagram illustration of an example recording system, in accordance with the principles of the present disclosure.

Image recording systems and audio recording systems are incorporated in many modern day consumer electronic devices and objects. Miniaturized image sensors (e.g., cameras) and associated electronic communication and recording mechanisms (e.g., camera units or systems, audio recording systems) may, for example, be incorporated in any number of different types of devices, including, for example, handheld devices (e.g., smartphones and the like), wearable devices such as hand and/or wrist worn devices (e.g., smart watches, smart bracelets, smart rings and the like), head mounted devices (smart glasses, goggles, headsets and the like), ear worn devices, neck worn lanyard devices, other mobile devices (tablet computing devices, laptop computing devices and the like), desktop computing devices, smart televisions, smart speakers, and other such devices.

Smart glasses are wearable computer glasses that add information alongside or to what the wearer sees. Smart glasses can, for example, impose graphics on the view in front of the wearer to present him or her with information from a computer or a smart phone. Like other computers, smart glasses may collect or record information from internal or external sensors (e.g., cameras, microphones, etc.). Smart glasses can, for example, take photos, record video, and capture conversations.

Smart glasses can be used as a body-worn camera. The camera may be turned on or turned off discreetly, for example, by the wearer by activating an on-off mechanism in the smart glasses. Some people may view the use of body-worn cameras as problematic and controversial in public or social situations. For example, some people may view the body-worn cameras as potentially invading the privacy of other persons (e.g., bystanders) in the field of view by covertly recording images or conversations without consent. Bystanders may not be aware that they are being recorded and may at least subjectively feel a lack of situation awareness and control. Different bystanders may have different notions of personal privacy and correspondingly different levels of privacy concerns on being quietly recorded. The presence of a camera that can potentially be "always-on" to record photographs may be perceived as a threat to privacy by some bystanders, and cause these bystanders to be averse to being in the presence of the wearer of the smart glasses. These bystanders may socially avoid the wearer of the smart glasses. This social aversion or avoidance can cause the wearer to forgo wearing the smart glasses.

Bystanders with high degrees of privacy concerns may need assurance that their images are not being inadvertently or surreptitiously recorded. To mitigate these bystanders' privacy concerns in the presence of the camera, in one example solution the smart glasses can include a privacy notifier or status indicator (e.g., a light emitting diode (LED), hereinafter "bystander LED") which can announce (e.g., visually) a privacy risk to bystanders in the vicinity of the smart glasses. The privacy notifier (also referred to as a status indicator herein) may announce the privacy risk based on an operational status of the camera or microphone. For example, the bystander LED may provide a privacy notification signal by emitting light to visually indicate when the camera is in a ready status (i.e., an on or activate mode) to capture images, and may remain dark when the camera is in an unready status (i.e., an off or idle mode) to take pictures.

Unfortunately, it is possible for a bad actor to tamper with the status indicator to prevent or interfere with the privacy notification signal to deceive bystanders about the presence of the camera or the microphone. The bad actor may, for example, hide the status indicator (e.g., by expediently covering up the bystander LED with a sticker) to the privacy notification signal (light) from reaching the bystanders. If the bystander LED is not visible because it is covered up due to the tampering, some bystanders may be deceived into thinking the camera is off even when the camera is actually on. One technical solution to solve this technical problem and to help those people have privacy concerns of being in a vicinity of a body-worn camera is to disable the camera system when the privacy notifier mechanisms are tampered with and/or disabled. That is, one solution to these issues is to have a system and techniques to detect tampering with the privacy notification mechanism and to disable the camera system upon detection of tampering with the privacy notification mechanism.

Image recording systems and audio recording systems may be described herein using smart glasses as an example consumer electronic product. However, it will be understood that the disclosed image recording systems and audio recording systems may be incorporated in any of a number of different types of electronic products, including, for example, handheld devices (smartphones and the like), wearable devices such as hand and/or wrist worn devices (smart watches, smart bracelets, smart rings and the like), head mounted devices (goggles, headsets and the like), ear worn devices, neck worn lanyard devices, other mobile devices (tablet computing devices, laptop computing devices and the like), desktop computing devices, smart televisions, smart speakers, and other such devices.

Systems and methods for detecting tampering with privacy notifier mechanisms in image recording systems and audio recording systems are described herein, in accordance with the principles of the present disclosure.

For convenience in description, the term "recording systems" may be used herein to refer collectively or interchangeably to image recording systems, to audio recording systems, or to recording systems that include both image recording and audio recording features.

A consumer electronic product may include a recording system (e.g., a camera (camera unit)) capable of recording images of bystanders. The recording system may include one or more privacy notifier mechanisms that can generate notification signals to announce that the camera may be in an activate mode ready to capture images. The notification signals may be intended to alert bystanders of the presence of the camera. In some implementations, the privacy notifier mechanisms may include a speaker (e.g., an electroacoustic transducer) that can generate a notification signal (audio signal) to audibly announce to bystanders that the camera may be in an activate mode ready to capture images. In some implementations, the privacy notifier mechanisms may, in addition to, or as an alternative to the speaker, include a LED (e.g., bystander LED) that can generate a notification signal (light signal) to visually announce to bystanders that the camera may be in an activate mode ready to capture images. The bystander LED can turn off (i.e., go dark) when the camera is in an idle mode.

In an exemplary embodiment, the LED (or another light emitting element) may, in a first operation state, transmit the privacy notification signal by emitting light, and may be configured, in another second operation state, to detect blocking of light emitted by the light emitting element. A single electronic component may thus serve as a component for both a generation of the notification signal and for a sensing of a potential tampering. Thereby, at least two functions may be integrated in the single electronic component in form of the light emitting element without the need to add additional hardware. This may also result in using the single electronic component already present in the consumer electronic product for additionally detecting tampering by adding a controlling circuit and/or algorithm implementing the proposed solution.

For example, when forward biased, a bystander LED may serve as a light source (generator). When reversed biased, the bystander LED may serve as a light detector. The disclosed systems and methods involve using the bystander LED both as a light source (light generator) as well as a light detector. The bystander LED as a light detector may be configured to detect incoming ambient light. The incoming ambient light may be dependent on the general lighting around the user, which may fluctuate between day/night, indoor/outdoor conditions, etc. Usually or normally, both the camera and the bystander LED should sense about a same level of ambient light. Comparison of the ambient light level sensed by the camera with the ambient light level sensed by the bystander LED may provide an indication of tampering with the LED. For example, an instance of the bystander LED sensing a lower level of ambient light than the camera may be an indication of tampering with the LED (i.e., a blocking or prevention of ambient light from entering the LED).

In the disclosed recording systems, the bystander LED is intermittently or periodically reverse biased to act as a photodetector. When the bystander LED is tampered with (e.g., covered up) ambient light may be prevented from entering the LED. The ambient light level in the tampered bystander LED is less than the ambient light level in an un-tampered bystander LED. Discharge currents in the reverse biased bystander LED (photodetector) are a measure of the ambient light level in the bystander LED. Tampering is detected by identifying instances where the measured discharge currents in the reverse biased bystander LED (photodetector) are less than the discharge currents expected for an un-tampered LED.

In example implementations, the systems and methods may involve disabling the camera unit when instances of tampering of the one or more privacy notifier mechanisms (e.g., the speaker, or the bystander LED) is detected.

FIG. 1A is a schematic a block diagram of a recording system 10 configured to detect tampering with a privacy notifier mechanism (e.g., a LED 50) of a camera unit (e.g., camera unit 11), in accordance with the principles of the present disclosure.

Recording system 10 may be deployed in any consumer electronic product (e.g., handheld devices such as smartphones, wearable devices such as smart watches, smart bracelets, smart rings and the like, head mounted devices such as smart glasses, and fixed location devices such as video doorbells, etc.) to record images.

Recording system 10 may, for example, include a camera unit 11. Camera unit 11 may include a lens 12, an image sensor 14, and a shutter 16. Image sensor 14 may be a solid state image sensor (e.g., a CMOS image sensor, a CCD image sensor, etc.) that can capture light that enters camera unit 11 through lens 12 and produce a digital image (a still image or a video image). In some implementations, camera unit 11 may include an ambient light sensor (ALS) (e.g., ALS 15)) configured to detect an amount or level of ambient light 30 present in camera unit 11. In some implementations, image sensor 14 may additionally function as an ambient light sensor to detect the amount or level of ambient light 30 present in camera unit 11.

Camera unit 11 may further include, or be coupled to, a status indicator (e.g., LED 50) and a temperature sensor 13 (in addition to lens 12, image sensor 14, and shutter 16). The components of camera unit 11 (including lens 12, image sensor 14, and shutter 16, LED 50, etc.) may be coupled to, and managed by, a microprocessor-based controller 40. The functions of controller 40 may be implemented in hardware, software, or a combination of hardware and software. Controller 40 may, for example, include a microprocessor 42 configured to implement the functions of controller 40 to manage camera unit 11.

In camera unit 11, LED 50 may for example, be a multi-color LED (e.g., a red-blue-green (RBG) LED), or a single color LED (e.g., a R, B, or G LED). LED 50 may be switchable between a first operation state, e.g., an inactive state (i.e., a reverse biased state) with no light emission, and another operation state, e.g., an active state (i.e., a forward biased state) with light emission (e.g., light 52, FIG. 1B). Temperature sensor 13 may, for example, be an infra-red or contact temperature sensing device configured to measure a temperature (e.g., an ambient temperature) of LED 50. ALS 15 may be a device configured to measure an amount of ambient light (e.g., ambient light 30) present or incident on camera unit 11. In example implementations, ALS 15 may be a photodetector, a phototransistor, or a photonic integrated circuit integrating a photodetector and an amplifier in one device.

Image sensor 14 may be a solid state image sensor (e.g., a CMOS image sensor, a CCD image sensor, etc.) that can capture light that enters the camera through lens 12 and produce a digital image. In some implementations, image sensor 14 may include functions (or be coupled with ALS 15) to detect amounts of ambient light 30 present.

In some implementations, shutter 16 may be operable between a closed position blocking ambient light 30 from reaching image sensor 14, and an open position allowing ambient light 30 to reach image sensor 14. Shutter 16 may control how long image sensor 14 is exposed to ambient light 30 to capture an image. In example implementations, a time period of exposure to capture the image may be based on the amount of ambient light 30 present (e.g., as detected or measured by ALS 15).

In example implementations, shutter 16 may be a mechanical shutter. Opening or closing of the mechanical shutter may be accompanied by generation of an opening or closing shutter sound (e.g., a clicking sound). In some implementations, shutter 16 may be an electronic shutter that can switch image sensor 14 on and off for the time period of exposure to capture the image. In example implementations, opening or closing of the electronic shutter (e.g., shutter 16) may be accompanied by generation of a system sound simulating the opening or closing of a mechanical shutter (e.g., a clicking sound).

In example implementations, camera unit 11 may include (or be coupled to) a microphone 17 configured to pick up the sounds associated with the opening or closing of shutter 16. Camera unit 11 may include a speaker 18 configured to broadcast the sounds associated with the opening or closing of shutter 16. Speaker 18 may serve as a privacy notifier mechanism (in addition to, or as an alternative to, LED 50) in recording system 10, in accordance with the principles of the present disclosure.

In recording system 10, if LED 50 has been tampered with, for example, by placing a cover over LED 50, it may be expected that the level of ambient light entering LED 50 will be reduced compared to the level of ambient light entering an untampered LED 50. Controller 40 may be configured to periodically or intermittently determine a level of ambient light that is incident on LED 50. Controller 40 may be configured to detect tampering with LED 50 by using reverse biased LED 50 as a photodetector to detect a level of ambient light that is incident on LED 50. If the determined level of ambient light is less than a reference level of ambient light, the drop in the level of ambient light that is incident on LED 50 may be an indication of tampering with LED 50.

Controller 40 may, for example, be a system on a chip (SoC) that integrates all or most components of a computer or other electronic system. The SoC may provide other functions in the consumer electronic device in which camera unit 11 is deployed. For smart glasses these other functions may, for example, include wireless communications with external computer systems, databases, storage or recording systems, vision processing, translation service, preparing and sending stimuli (e.g., captions, images and patterns) for display on a virtual display, etc.

Controller 40 may be configured to control operation of camera unit 11, for example, by powering image sensor 14 to record an image, and operating camera shutter 16 to control the time period of exposure to record the image.

In example implementations, controller 40 may include two general-purpose input/output (GPIO) pins (e.g., GPIO 1 and GPIO 2). GPIO 1 and GPIO 2 may be uncommitted digital signal pins on an integrated circuit or electronic circuit board in controller 40, and may be used either as an input or output, or both, by controller 40. In example implementations, GPIO 1 may be a (voltage) supply rail of controller 40. LED 50 may be connected to controller 40 across, or between, GPIO 1 and GPIO 2. Controller 40 may turn LED 50 on (forward bias) or off (reverse bias) by applying digital logic signals 44 (e.g., logic high (H) and low (L) signals) to LED 50 over GPIO 1 and GPIO 2.

In accordance with the principles of the present disclosure, controller 40 may be configured to control operation of camera unit 11 in conjunction with controlling operation of LED 50.

As used herein, the term "ready state" of the recording system refers to a state in which components of the recording system are powered (energized) to commence recording images either automatically, or promptly upon receipt of user instructions. The user instructions to record images may be received via, for example, a mechanical switch or button, a touch interface, or a voice activated interface, etc.

Figure 1B:
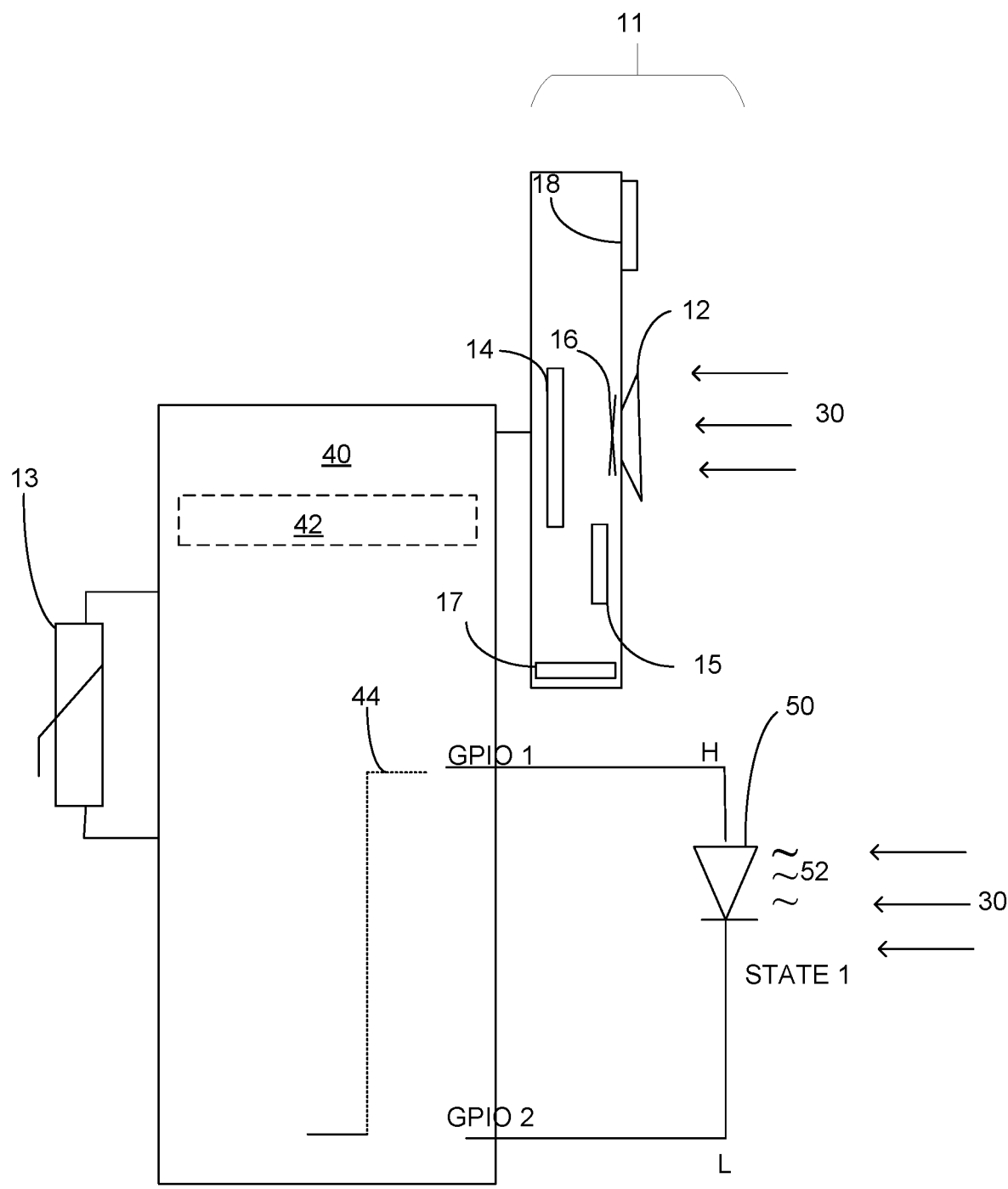
FIG. 1B is a block diagram illustration of the recording system of FIG. 1A in a first state, in accordance with the principles of the present disclosure.

Controller 40 may, for example, be configured to place camera unit 11 in a ready state to record images (e.g., by powering image sensor 14). As shown in FIG. 1B, when placing camera unit 11 in the ready state, controller 40 may simultaneously turn on LED 50 in an active state (e.g., STATE 1) to emit light (e.g., light 52) to announce (e.g., to bystanders) that camera unit 11 can record images. Controller 40 may forward bias (i.e., activate) LED 50 to emit light in the active state (e.g., STATE 1). In example implementations, controller 40 may forward bias LED 50 by applying a logic high (H) signal to GPIO 1 (while keeping GPIO 2 at a logic low (L)). In the active state (e.g., STATE 1), LED 50 may emit light 52 to announce that camera unit 11 is in a ready state to capture images.

Figure 1C:
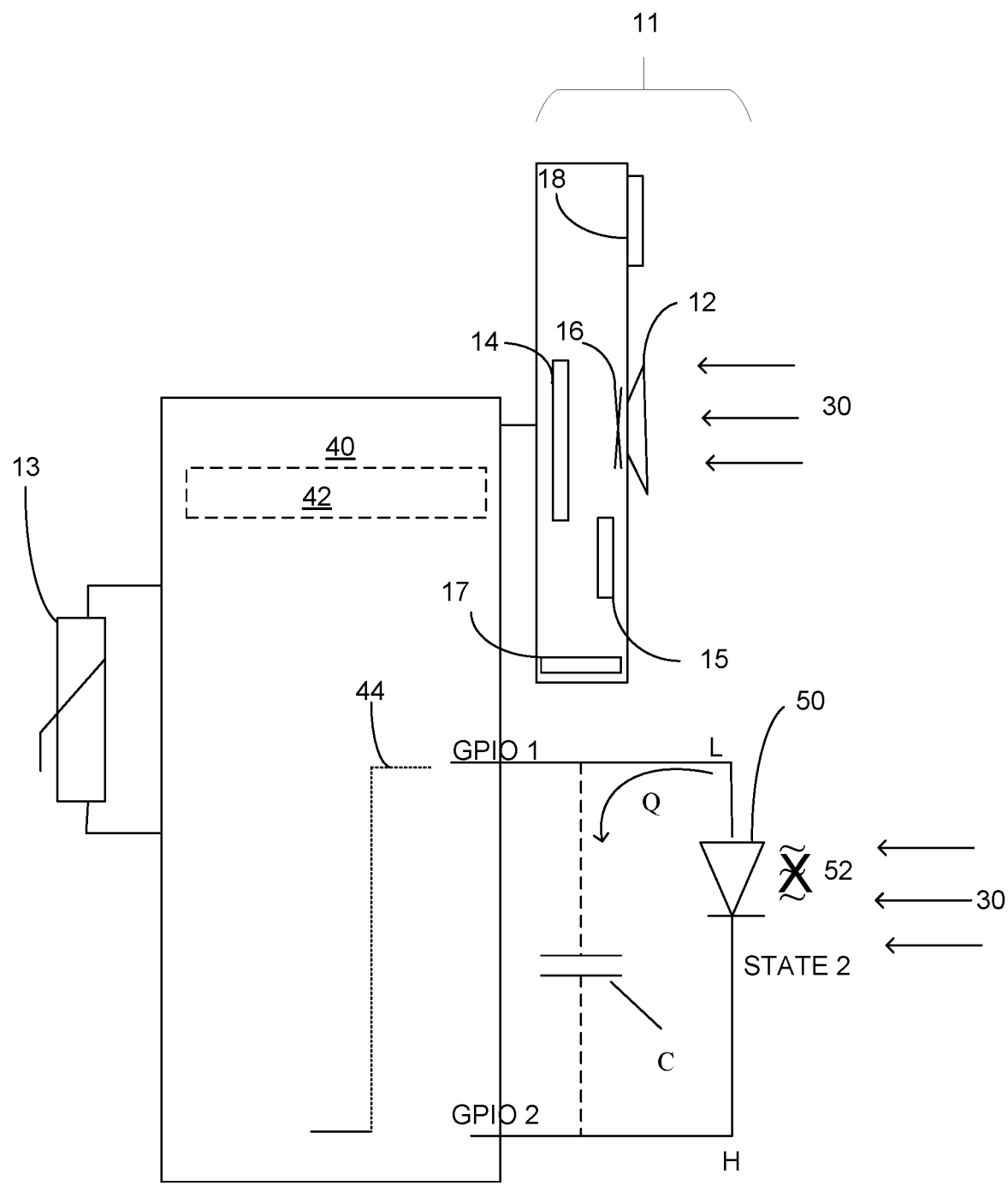
FIG. 1C is a block diagram illustration of the recording system of FIG. 1A in a second state, in accordance with the principles of the present disclosure.

When camera unit 11 is not in a ready state (i.e., is in an unready state) to record images controller 40 may reverse bias (i.e., deactivate) LED 50 to place LED 50 in an inactive state (e.g., STATE 2). Light emission from the LED 50 may be stopped as there may be no need to announce (e.g., to bystanders) that camera unit 11 can record images. As shown in FIG. 1C, controller 40 may reverse bias LED 50 to place LED 50 in a deactivated state (e.g., STATE 2) in which the LED does not emit light. In example implementations, controller 40 may reverse bias LED 50 by applying a logic low (L) signal to GPIO 1 (while placing GPIO 2 at a logic high (H)). In the deactivated state (e.g., STATE 2), LED 50 stops emitting light 52 (as pictorially indicated by the X symbol placed over light 52 in FIG. 1C).

As LED 50 is reverse biased to place it in the deactivated state (e.g., STATE 2) LED 50 stops emitting light 52, and capacitances (e.g., parasitic capacitance C) associated with LED 50 accumulate a charge (e.g., charge Q). The parasitic capacitance C may be a result of mobile electrons and holes on each side of the p-n junction and depletion layer (not shown) in LED 50.

Figure 1D:
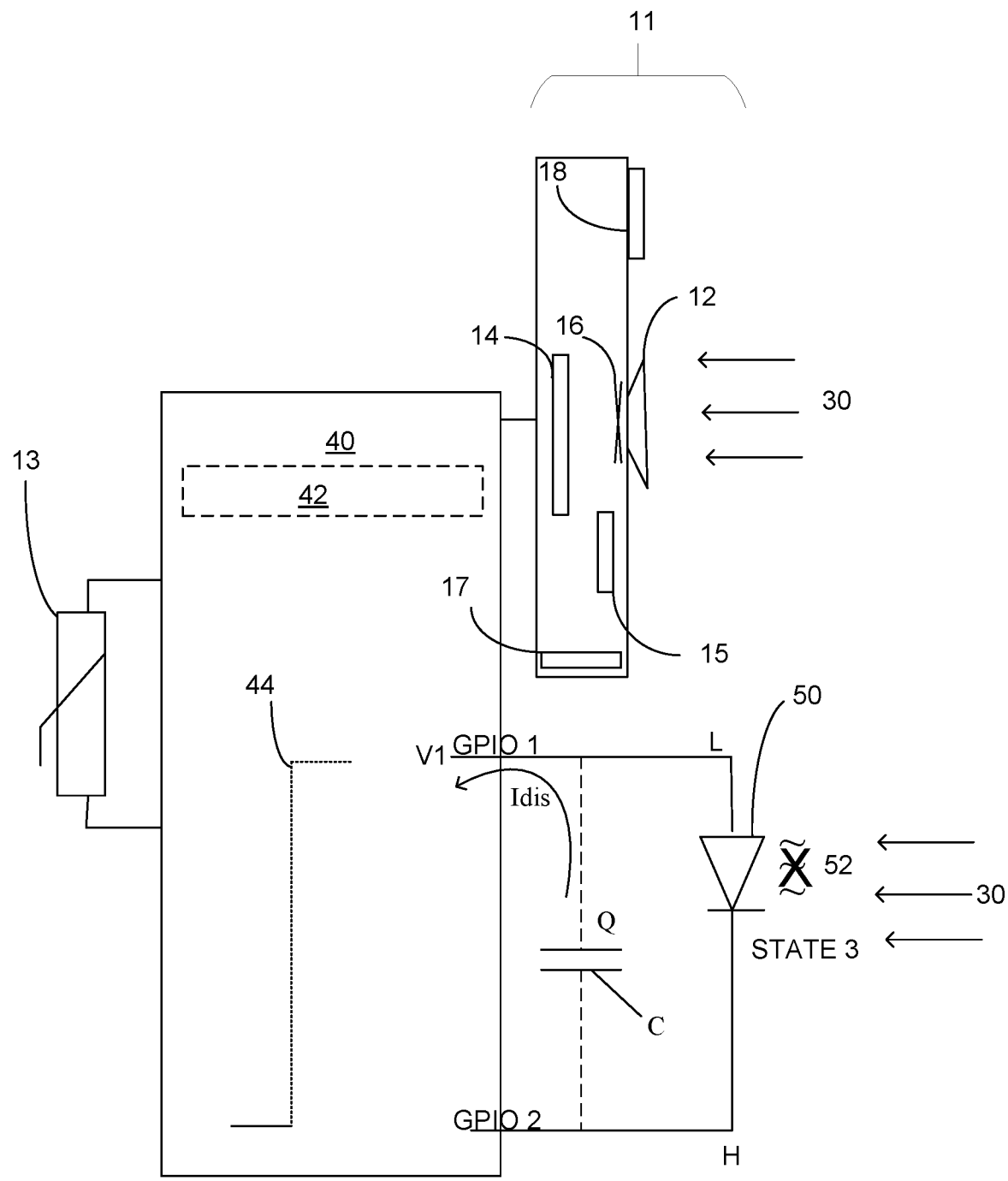
FIG. 1D is a block diagram illustration of the recording system of FIG. 1A in a third state, in accordance with the principles of the present disclosure.

LED 50 with accumulated charge Q on parasitic capacitance C may be characterized as being in a measurement state (e.g., STATE 3) as shown in FIG. 1D.

LED 50 in the measurement state (e.g., STATE 3) can function as a photodetector to determine the amount of ambient light 30 incident on LED 50. Charge Q on parasitic capacitance C in STATE 3 can be discharged by a leakage current (Idis) that is dependent on the amount of ambient light 30. A discharge rate or time Td (e.g., discharge time TA, FIG. 2) of parasitic capacitance C may, for example, be inversely proportional to a size or amount of leakage current Idis. When the LED 50 is tampered with (i.e., covered up) a lesser amount of ambient light (e.g., light 30) reaches LED 50 resulting in smaller leakage currents than in the case of an untampered LED 50. Correspondingly, the discharge time (Td) of parasitic capacitance C in a tampering scenario may be longer (i.e., greater) than the discharge time of an untampered LED 50.

In example implementations, to identify tampering instances, controller 40 may be configured to place LED 50 in a photodetector mode (e.g., STATE 3) (e.g., by periodically or intermittently reverse biasing of LED 50) and measuring the discharge time Td of parasitic capacitance C.

In example implementations, controller 40 may be configured to measure voltages on the input/out pins (i.e., GPIO 1 and GPIO 2) as a function of time to determine the discharge time Td of parasitic capacitance C. In an example scenario, in STATE 3, GPIO 1 may serve as power supply rail with a supply rail voltage VSR. Initially, GPIO 1 logic may be low (e.g., L) and a voltage V1 at GPIO 1 may be low (e.g., zero). GPIO 2 may be a high impedance input (HiZ) pin.

The initially low voltage V1 on GPIO 1 may increase in time toward supply rail voltage VSR as the parasitic capacitance C is discharged by the light dependent leakage current Idis. A discharge time Td of the parasitic capacitance C may be determined by analysis of changes in the voltage V1 as a function of time (i.e., by analysis of voltage V1 versus time curves). In example implementations, controller 40 may include algorithms to determine the discharge time Td of parasitic capacitance C as being the time it takes the increasing voltage V1 to cross a predetermined logic threshold voltage (VLT).

Figure 2:
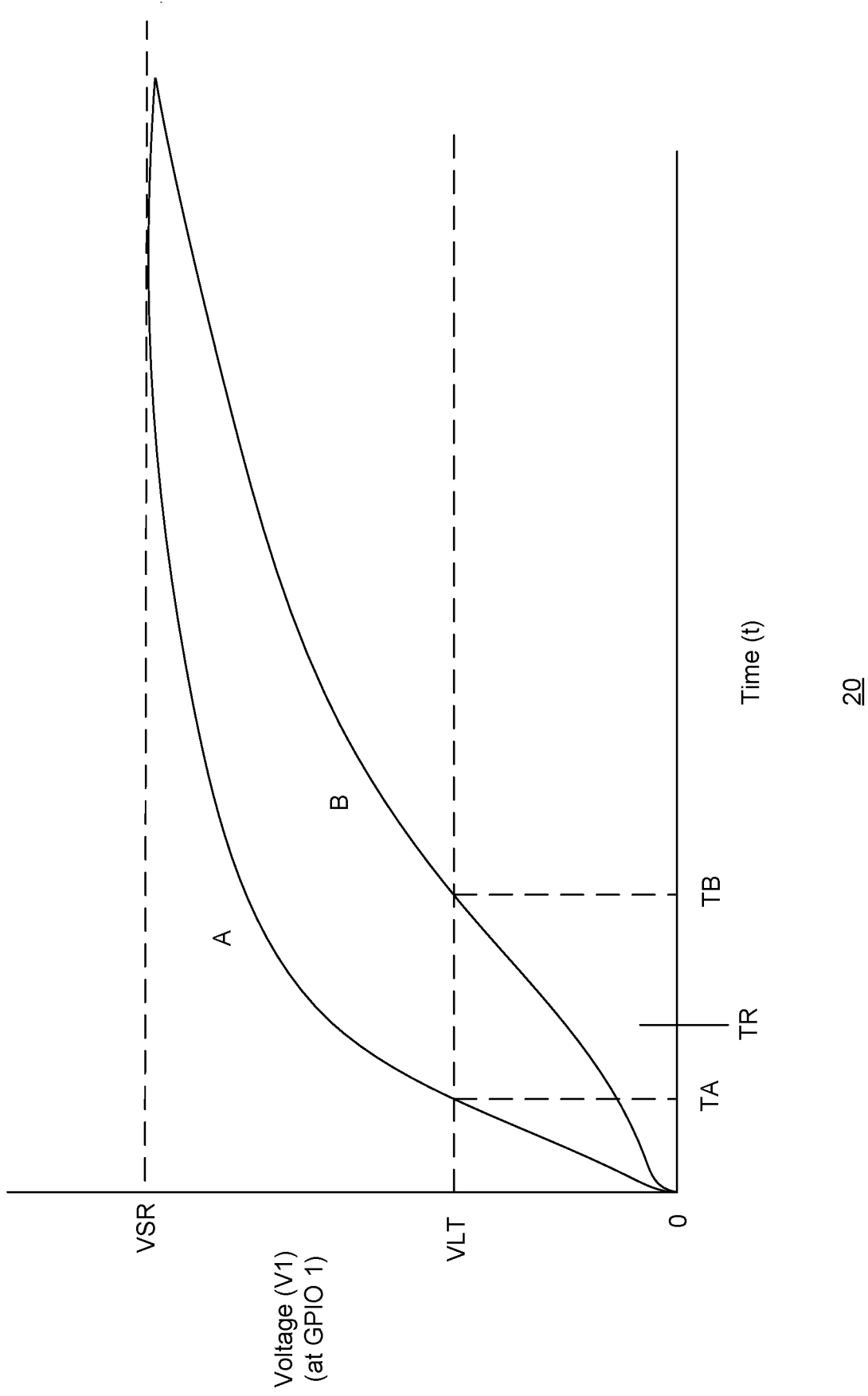
FIG. 2 is an illustration of a voltage versus time curve.

In recording system 10, GPIO voltage V1 may be a logic input to controller 40. FIG. 2 shows empirical GPIO voltage V1 versus time curves (e.g., curves 20) that may be measured by controller 40 in example LED 50 scenarios (scenarios A and B). Scenario A may correspond to a case in which LED 50 is not tampered with, and is fully exposed to all of the available ambient light 30. Scenario B may correspond to a case in which LED 50 is tampered with (i.e., covered up) and may be in the dark (i.e., exposed to less than all of the available ambient light 30).

As shown in FIG. 2, as the parasitic capacitance C at the LED (e.g., LED 50) is discharged by light dependent leakage current Idis in the LED, voltage V1 at GPIO 1 increases with time. As voltage V1 at GPIO 1 crosses a predetermined logic threshold (e.g., voltage VLT), GPIO 1 may switch from logic low to logic high. Controller 40 may algorithmically determine the discharge time Td of parasitic capacitance C to be the time it takes the voltage V1 to cross the predetermined logic threshold voltage (VLT). For example, as shown in the figure, controller 40 may determine that the time TA when voltage V1 crosses voltage VLT is the discharge time in scenario A, and similarly may determine that the time TB when voltage V1 crosses voltage VLT is the discharge time in scenario B.

As shown in FIG. 2, discharge times (e.g., times TA and TB) are different for different ambient light level scenarios. In scenario A (un-tampered LED), the ambient light level in the LED is high, the discharge current is therefore also high, and the measured discharge time TA is short. In scenario B (tampered LED), the ambient light level in the LED is lower, the discharge current is therefore also low, and the measured discharge time TB is long (i.e., TB>TB).

Controller 40 may include a reference discharge time TR for LED 50 (e.g., in an untampered state). The reference discharge time TR for LED 50 may be empirically based on measurements on an untampered LED. Controller 40 may compare a measured discharge time (e.g., measured discharge times TA, TB) of LED 50. If the measured discharge time (e.g., discharge time TB) of the LED is substantially more (e.g., 10 to 20% more) than the reference discharge time TR, controller 40 may determine that LED 50 has been tampered with (e.g., because the ambient light has been blocked from entering the bystander LED). Based on a determination of tampering, controller 40 may then disable camera unit 11 (e.g., to prevent privacy violations and misuse). Controller 40 may, for example, disable camera unit 11 by disabling image sensor 14 and/or closing shutter 16.

In many instances, the reverse current (i.e., light dependent leakage current Idis) in LED 50 (and hence the discharge time of the LED) may be temperature dependent. In example implementations, the reference discharge time TR may be set for, or associated with, a particular temperature. Controller 40 may monitor the temperature (e.g., using temperature sensor 13) at which the discharge time LED 50 is measured (e.g., at STAGE 3, FIG. 1D). When the determination of the discharge time LED 50 occurs at an ambient temperature different than the particular temperature associated with the reference discharge time TR, controller 40 may compensate for the temperature dependence of leakage current Idis using temperature compensation algorithms in software. The temperature compensation algorithms may be factory-calibrated per device. Alternatively, the temperature compensation algorithms may be based on a theoretical temperature dependence of the leakage current Idis on parameters such as the bandgap of LED 50. Controller 40 may use a temperature-compensated value of the reference discharge time TR to compare the measured discharge time (e.g., measured discharge times TA, TB) of LED 50 to determine if the LED is tampered.

Figure 3:
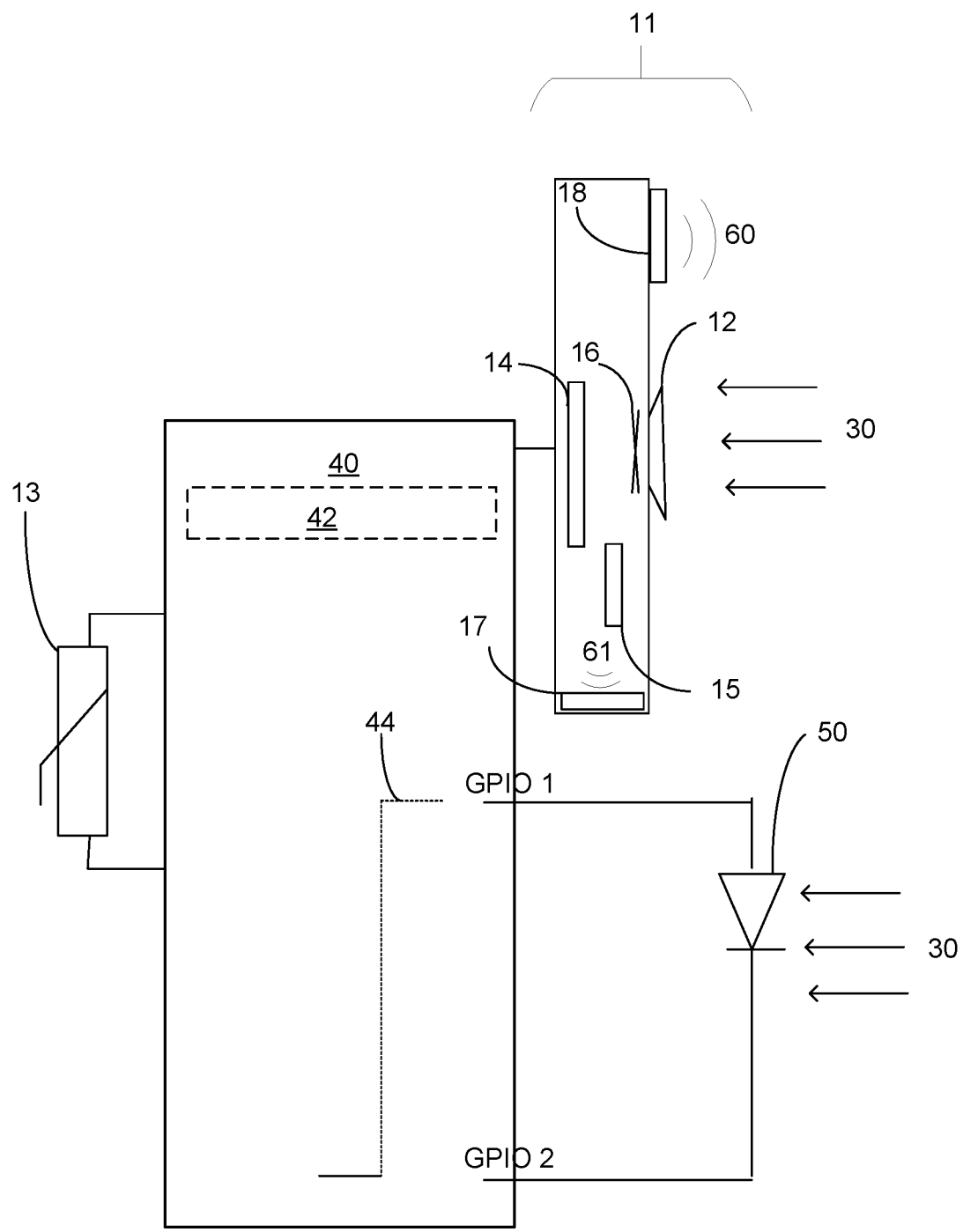
FIG. 3 is another block diagram illustration of the recording system of FIG. 1A, in accordance with the principles of the present disclosure.

In example implementations of recording system 10, in addition to or as an alternative to LED 50, speaker 18 may be configured as a privacy notification mechanism. Speaker 18 may be configured to announce to bystanders that camera unit 11 is in a recording enabled mode. In example implementations, as shown in FIG. 3, speaker 18 may, for example, broadcast sounds 60 (e.g., shutter 16 opening and closing sounds (or other cover sounds)) to indicate that camera unit 11 is in a recording enabled mode. A bad actor may, for example, tamper with speaker 18 (e.g., by expediently covering speaker 18 with a sticker) to prevent or interfere with notification signals (e.g., sounds 60) being radiated to bystanders. The detect such tampering, controller 40 may use on-board microphone 17 to pick up (i.e., listen to) sound output from speaker 18 (e.g., when speaker 18 is activated in response to shutter 16 closing or opening). Controller 40 may compare the speaker sounds picked up by on-board microphone 17 with reference speaker sounds 61 obtained in controlled un-tampered conditions in which speaker 18 has not been tampered with. An absence of (or reduction in the intensity of) the reference speaker sounds 61 in the sounds picked up by on-board microphone 17 may indicate tampering of speaker 18. In response to the detection of speaker tampering, controller 40 may, like in the case of bystander LED tampering, disable camera unit 11 (e.g., to prevent privacy violations and misuse). Controller 40 may, for example, disable camera unit 11 by disabling image sensor 14 and or closing shutter 16.

FIG. 4 shows an example method 400 for identifying tampering of privacy notifier mechanisms in a recording system, in accordance with the principles of the present the present disclosure.

The recording system (e.g., recording system 10) may include a camera (e.g., camera unit 11) capable of capturing images of bystanders. The privacy notifier mechanisms of the recording system may, for example, include a LED (e.g., LED 50), which outputs a notification signal light (e.g., emits light) to notify bystanders when the camera is in a ready state to capture images. As another example, the privacy notifier mechanisms of the recording system may include a speaker configured to output a notification signal sound (e.g., camera shutter or cover opening and closing sounds, a beep, a click, etc.) to alert bystanders of the presence of the camera (e.g., camera unit 11) capable of capturing images of bystanders.

The recording system 10 may be deployed in any consumer electronic product (e.g., handheld devices such as smartphones, wearable devices such as smart watches, smart bracelets, smart rings and the like), head mounted devices such as smart glasses, fixed location devices such as video doorbell, etc.) to record images of bystanders. Method 400 may be implemented in any consumer electronic product including recording system 10 without making any additions to, or subtractions from, the pre-existing hardware components of recording system 10 or the consumer electronic product.

Method 400 may include activating a privacy notifier mechanism in the recording system to transmit a privacy notification signal when the recording system is in a ready state to capture images (410). The privacy notification signal may alert bystanders of a presence of the recording system (camera) in a ready state to capture images.

In example implementations, the privacy notifier mechanism may be a LED, and the privacy notification signal may be light emitted by the LED. Activating the privacy notifier mechanism to transmit a privacy notification signal 410 may include forward biasing the LED to emit light.

The transmission of the privacy notification signal (i.e., light emitted by the LED) may be blocked, for example, as a result of tampering with the privacy notifier mechanism (e.g., by placing a sticker or cover over the LED).

Method 400 may further include detecting blocking of transmission of the privacy notification signal (420), and responsive to the detecting blocking of the transmission of the privacy notification signal by the processor, disabling the camera (430).

Detecting blocking of the transmission of the privacy notification signal 420 may, for example, include detecting blocking of light emitted by the LED (e.g., blocking of light emitted by the LED by a sticker or cover placed over the LED). Detecting blocking of light emitted by the LED may include turning off light emission and reverse biasing the LED to place the LED in a photodetector mode, and measuring the ambient light entering the LED in the photodetector mode. Reverse biasing the LED to place the LED in a photodetector mode may accumulate a charge Q on parasitic capacitances in the LED. The charge Q may be discharged in the photodetector mode by a light induced discharge current (e.g., Idis). Measuring the ambient light entering the LED in the photodetector mode may include measuring a discharge time (e.g., time Td) of the charge Q accumulated on parasitic capacitances in the LED. Detecting blocking of light emitted by the LED may further include comparing the measured discharge time (e.g., time Td) of the charge Q with a reference discharge time (set for the case when light emitted by the LED is not blocked). Method 400 may include identifying an instance of blocking of the transmission of the privacy notification signal when the measured discharge time (e.g., time Td) of the charge Q is greater than the reference discharge time.

In example implementations, method 400 may include measuring a temperature of the LED and temperature compensating a value of the reference discharge time used for comparison with the measured discharge time (e.g., time Td) of the charge Q.

In example implementations, the instance of blocking of the transmission of the privacy notification signal may be identified when the measured discharge time (e.g., time Td) of the charge Q is greater than 10% over the reference discharge time.

In example implementations, the LED may be placed across two general purpose input output (GPIO) pins of a controller. Method 400 may include applying logic high-low signals to the GPIO pins for forward biasing the LED to emit light, and for reverse biasing the LED to place the LED in a photodetector mode.

In method 400, measuring a discharge time (e.g., time Td) of the charge Q accumulated on parasitic capacitances in the LED may include measuring a voltage on a GPIO pin as a function of time and identifying a time it takes the voltage to cross a logic threshold as the discharge time.

In some example implementations, the privacy notifier mechanism in the recording system may be a speaker, and the privacy notification signal may be a sound signal. Activating the privacy notifier mechanism to transmit the privacy notification signal 410 may include activating the speaker to broadcast the sound signal including, for example, sounds replicating camera shutter closing and opening sounds, other cover closing and opening sounds, or simulated sounds (e.g., clicks or beeps) that indicate the presence of the camera (e.g., camera unit 11) capable of capturing images of bystanders. Detecting blocking of the transmission of the privacy notification signal 420 may include using an on-board microphone to pick up (i.e., listen to) sound output from the speaker (e.g., when the speaker is activated in response to closing or opening of a camera shutter). Detecting blocking of the transmission of the privacy notification signal 420 may further include comparing the speaker sounds picked up by on-board microphone with reference speaker sound output. The reference speaker sound output may have been obtained in controlled untampered conditions in which the speaker has not been tampered with. An absence of (or reduction in an intensity of) the reference speaker sound output in the speaker sounds picked up by the on-board microphone may indicate tampering of the speaker. Method 400 may include identifying an instance of blocking of the transmission of the privacy notification signal when speaker sounds picked up by on-board microphone show an absence of or a reduction in intensity of the reference speaker sound output. In response to the detection of speaker tampering, method 400 may include, like in the case of bystander LED tampering, disable camera unit 11 and or the camera shutter (e.g., to prevent privacy violations and misuse).

As noted previously, recording system 10 (FIGS. 1A-1D, FIG. 2 and FIG. 3) with its privacy notification features (or some of the elements of recording system 10) may be incorporated in any number of types of consumer electronic devices.

Figure 5:
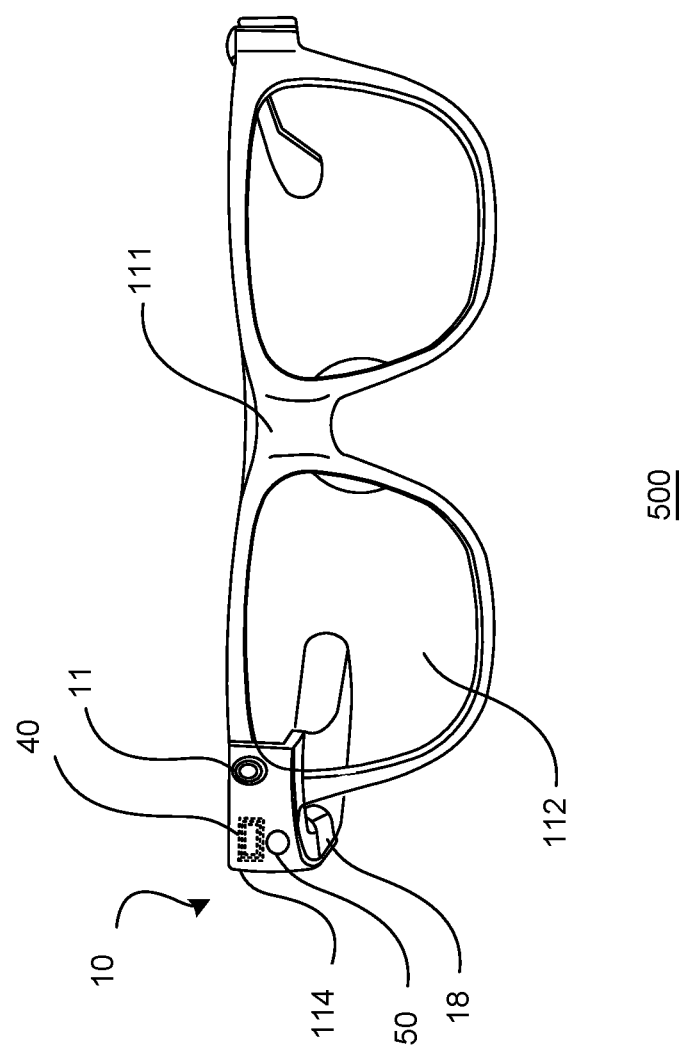
FIG. 5 is an illustration of an example user electronic device incorporating the recording system of FIG. 1A, in accordance with the principles of the present disclosure.

FIG. 5 is a front view of an example wearable device (e.g., smart glasses 110) incorporating elements of recording system 10.

The wearable device in the form of smart glasses 500 in the example shown in FIG. 5, may include a frame 111, with a display device 112 coupled to frame 111. Recording system 10 (including camera unit 11 and LED 50) may be mounted in frame 111. Camera unit 11 may be capable of capturing still and/or moving images, patterns, features, light and the like. LED 50 may be forward biased to emit light to notify bystanders of the presence of camera unit 11 when camera unit 11 is in a ready state to capture images. In some implementations, an electroacoustic transducer (e.g., speaker 18) may be coupled to the frame 111. In some implementations, a touch surface 114 allows for user control, input and the like of smart glasses 110. Controller 40 may include a processor (e.g., microprocessor 42, FIG. 1A) operably coupled to the components of recording system 10 and a communication module (not shown) providing for communication with external devices and/or networks. As discussed with reference to FIG. 1A through FIG. 4, LED 50 may light up to notify bystanders of the presence of camera unit 11 when in a ready state to capture images. Controller 40 may periodically (e.g., every few minutes) switch LED 50 to a photodetector mode and test whether LED 50 has been tampered. If tampering is detected controller 40 may disable camera unit 11.

Figure 6:
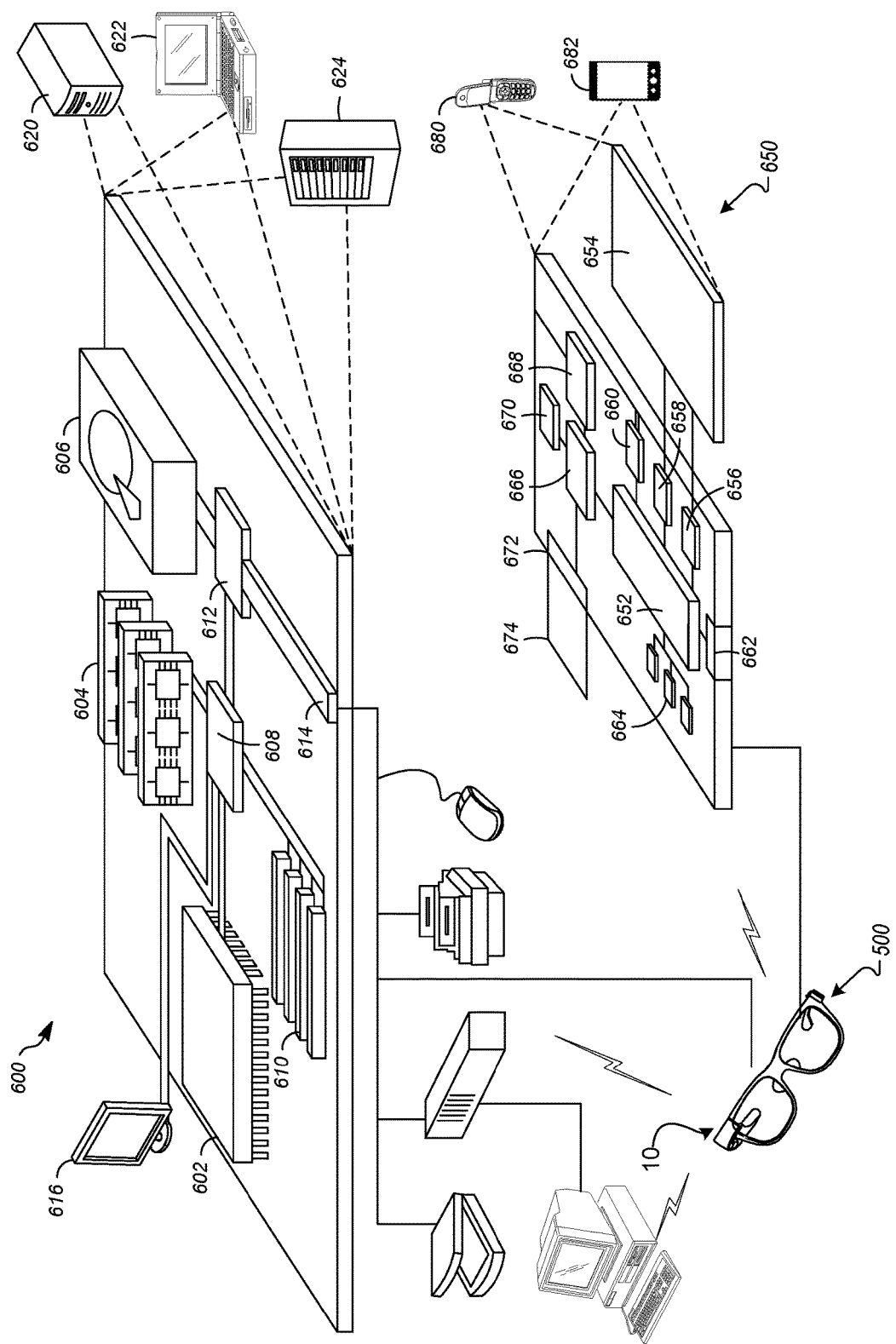
FIG. 6 is an illustration of a generic computer device and a generic mobile computer device coupled to the example recording system of FIG. 1A, in accordance with the principles of the present disclosure.

FIG. 6 shows an example of a generic computer device 600 and generic mobile computer devices 650, which may be used with recording system 10 and consumer electronic devices (such as smart glasses 500) and with the techniques described herein. Computing device 600 is intended to represent various forms of digital computers, such as laptops, desktops, tablets, workstations, personal digital assistants, televisions, servers, blade servers, mainframes, and other appropriate computing devices. For example, computing device 600 may be and/or be used as the server referenced above. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. The processor 602 can be a semiconductor-based processor. The memory 604 can be a semiconductor-based memory. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 666, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA600, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or another similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described herein), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

What is claimed is:

1. A computer-implemented method, comprising:
    activating, by a processor, a privacy notifier mechanism in a recording system to transmit a privacy notification signal when a camera in the recording system is in a ready state to capture images, wherein the privacy notifier mechanism includes a light emitting diode, LED;
    comparing a measured discharge time of a charge accumulated on parasitic capacitances of the LED with a reference discharge time;
    measuring a temperature of the LED in the recording system and temperature compensating a value of the reference discharge time used for comparison with the measured discharge time;
    detecting blocking of the transmit of the privacy notification signal when the measured discharge time of the charge accumulated on the parasitic capacitances is greater than the reference discharge time; and
    responsive to detecting blocking of the transmit of the privacy notification signal by the processor, disabling the camera.

2. The computer-implemented method of claim 1, wherein the privacy notifier mechanism comprises a light emitting element which, in a first operation state, transmits the privacy notification signal by emitting light, and in another second operation state is configured to detect blocking of light emitted by the light emitting element.

3. The computer-implemented method of claim 1, wherein activating, by the processor, the privacy notifier mechanism includes forward biasing the LED to emit light.

4. The computer-implemented method of claim 3, wherein detecting blocking of the transmit of the privacy notification signal includes detecting blocking of light emitted by the LED.

5. The computer-implemented method of claim 3, wherein the LED is placed across two general purpose input output (GPIO) pins of a controller, and the method includes: applying logic high-low signals to the GPIO pins for forward biasing the LED to emit light, and for reverse biasing the LED to place the LED in a photodetector mode.

6. The computer-implemented method of claim 5 further including reverse biasing the LED to place the LED in the photodetector mode and detecting blocking of the transmit of the privacy notification signal.

7. The computer-implemented method of claim 6 further including measuring ambient light entering the LED in the photodetector mode and comparing that with ambient light sensed through the camera.

8. The computer-implemented method of claim 5, wherein measuring the discharge time of the charge accumulated on the parasitic capacitances of the LED in the photodetector mode includes measuring a voltage on a GPIO pin as a function of time and identifying a time it takes the voltage to cross a logic threshold as the discharge time.

9. The computer-implemented method of claim 1, wherein the privacy notifier mechanism comprises a speaker, and wherein activating, by the processor, the privacy notifier mechanism includes activating the speaker to broadcast a sound signal indicative of a presence of the camera.

10. The computer-implemented method of claim 9, wherein detecting blocking of the transmit of the privacy notification signal includes comparing speaker sounds received by a microphone with a reference speaker sound.

11. The computer-implemented method of claim 10, wherein detecting blocking of transmission of the privacy notification signal comprises:
    detecting an absence or a reduction in an intensity of the reference speaker sound.

12. A system, comprising:
    a camera unit including a camera; and
    a controller including:
        at least one processor; and
        a memory storing instructions that, when executed by the at least one processor, cause the at least one processor to:
            activate a privacy notifier mechanism in a recording system to transmit a privacy notification signal when a camera in the recording system is in a ready state to capture images, the privacy notifier mechanism including a light emitting diode, LED;
            compare a measured discharge time of a charge accumulated on parasitic capacitances of the LED with a reference discharge time;
            measure a temperature of the LED in the recording system and temperature compensate a value of the reference discharge time used for comparison with the measured discharge time;
            detect blocking of the transmit of the privacy notification signal when the measured discharge time of the charge accumulated on the parasitic capacitances is greater than the reference discharge time; and
            responsive to detecting blocking of the transmit of the privacy notification signal, disable the camera.

13. A system, comprising:
    a camera unit including:
        a camera; and
        a light emitting diode, LED; and
    a controller including:
        at least one processor; and
        a memory storing instructions that, when executed by the at least one processor, cause the at least one processor to:
            forward bias the LED to emit light when the camera is in a ready state to capture images;
            periodically, reverse bias the LED to place the LED in a photodetector mode to detect blocking of the LED; and
            measure a discharge time of a charge accumulated on parasitic capacitances of the LED in the photodetector mode;
            compare the measured discharge time of the charge accumulated on parasitic capacitances with a reference discharge time;
            measure a temperature of the LED and temperature compensate a value of the reference discharge time used for comparison with the measured discharge time;
            detect blocking of the LED when the measured discharge time of the charge accumulated on parasitic capacitances is greater than the reference discharge time; and responsive to detecting blocking of the LED, disable the camera.

14. The system of claim 13, wherein the LED is placed across two general purpose input output (GPIO) pins of the controller, and wherein the instructions cause the processor to apply logic high-low signals to the GPIO pins for forward biasing the LED to emit light, and for reverse biasing the LED to place the LED in the photodetector mode.

15. The system of claim 13, wherein the instructions cause the processor to measure ambient light entering the LED in the photodetector mode.

16. The system of claim 14, wherein the instructions cause the processor to:
  measure the discharge time of the charge accumulated on the parasitic capacitances of the LED in the photodetector mode by measuring a voltage on a GPIO pin as a function of time and identifying a time it takes the voltage to cross a logic threshold as the discharge time.

17. The system of claim 13, wherein the camera unit further comprises:
  a speaker; and
  a microphone; and
  wherein the instructions cause the processor to activate the speaker to transmit a sound signal indicative of a presence of the camera capable of capturing images of bystanders, and compare speaker sounds picked up by the microphone with a reference speaker sound.

18. The system of claim 17, wherein the instructions further cause the processor to identify an instance of tampering with the speaker when the speaker sounds picked up by on-board microphone show an absence of, or a reduction in an intensity of the reference speaker sound.

\* \* \* \* \*